(12) United States Patent
Perry et al.

(10) Patent No.: US 7,412,456 B2
(45) Date of Patent: Aug. 12, 2008

(54) SYSTEM AND METHOD FOR IMPROVED EXPOSURE OF DATABASE SCHEMA INFORMATION

(75) Inventors: Carl Yates Perry, Woodinville, WA (US); Richard Feinauer, Bellevue, WA (US); Stephen F. Starck, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 390 days.

(21) Appl. No.: 11/063,421

(22) Filed: Feb. 22, 2005

(65) Prior Publication Data

US 2006/0190472 A1   Aug. 24, 2006

(51) Int. Cl.
*G06F 17/00* (2006.01)
*G06F 9/44* (2006.01)

(52) U.S. Cl. ............... 707/102; 707/2; 707/3; 707/10; 707/101; 707/103 R; 717/100; 717/120; 717/121; 711/100

(58) Field of Classification Search ............... 707/100, 707/101, 102, 103, 104, 2, 3, 10, 103 R; 711/100; 717/100, 120, 121
See application file for complete search history.

(56) References Cited

U.S. PATENT DOCUMENTS

| | | | |
|---|---|---|---|
| 6,571,232 B1 * | 5/2003 | Goldberg et al. | 707/2 |
| 6,988,103 B2 * | 1/2006 | Chithambaram et al. | 707/10 |

* cited by examiner

*Primary Examiner*—Shahid Al Alam
*Assistant Examiner*—Fred I Ehichioya
(74) *Attorney, Agent, or Firm*—Woodcock Washburn LLP

(57) ABSTRACT

Systems and methods for improved exposure of database schema information are disclosed. Generally, a database driver may retrieve and provide database schema information according to one of two default methods or, also, a third override method. The first default method is to execute a query on the database. The second default method is to retrieve information from a hard-coded collection stored locally at the driver. The third override method is to retrieve information from a designated file that may be updated at any time without having to update the database and/or driver binaries.

15 Claims, 6 Drawing Sheets

Fig. 2

```
<MetaDataCollections>
    <CollectionName>Tables</CollectionName>
    <NumberOfRestrictions>0</NumberOfRestrictions>
    <NumberOfIdentifierParts>2</NumberOfIdentifierParts>
    <PopulationMechanism>SQLCommand</PopulationMechanism>
    <PopulationString>SELECT * from sys.Tables</PopulationString>
</MetaDataCollections>
```

```
<MetaDataCollections>
   <CollectionName>DataTypes</CollectionName>
   <NumberOfRestrictions>0</NumberOfRestrictions>
   <NumberOfIdentifierParts>0</NumberOfIdentifierParts>
   <PopulationMechanism>DataTable</PopulationMechanism>
   <PopulationString>DataTypes</PopulationString>
</MetaDataCollections>

<DataTypes>
   <TypeName>ServerA_Float_V1 </TypeName>
   <ProviderDbType>1</ProviderDbType>
   <ColumnSize>4294967296</ColumnSize>
   <CreateFormat>ServerA_Float_V1</CreateFormat>
   <DataType>System.String</DataType>
   <IsAutoIncrementable>false</IsAutoIncrementable>
   <IsBestMatch>false</IsBestMatch>
   <IsCaseSensitive>true</IsCaseSensitive>
   <IsFixedLength>false</IsFixedLength>
   <IsFixedPrecisionScale>false</IsFixedPrecisionScale>
   <IsLong>true</IsLong>
   <IsNullable>true</IsNullable>
   <IsSearchable>false</IsSearchable>
   <IsSearchableWithLike>false</IsSearchableWithLike>
   <IsConcurrencyType>false</IsConcurrencyType>
   <IsLiteralSupported>false</IsLiteralSupported>
</DataTypes>
```

106b

SYSTEM AND METHOD FOR IMPROVED EXPOSURE OF DATABASE SCHEMA INFORMATION

FIELD OF THE INVENTION

The present invention relates to the field of information retrieval, and, more specifically, to the representation and discovery of database schema information.

BACKGROUND OF THE INVENTION

In conventional computing systems, the need to access large amounts of complex data is growing at a rapid pace. Accordingly, databases are capable of storing increasing volumes of data with increasingly complex structures. Databases are constantly updated with new versions that enable the storage of additional content and the creation of additional data types. To enable these databases to be efficiently accessed and manipulated, it is necessary to expose database schema information, which is metadata that describes the structure and/or content of the database.

This database schema information is exposed by a database driver. The term "driver," as used herein, refers to a database driver, database provider, or any middle layer mechanism that provides an application with access to a database. Conventional database drivers may expose database schema information to an application in a number of ways, namely, through query mechanisms, through hard-coded data, or through application program interface (API) calls directly to the database server.

A disadvantage of these conventional exposure mechanism is that they are limited with respect to updating of database schema information. For example, when a database is updated with new content, new data types, or generally any new information, the driver binaries that expose this information must also be updated along with the database binaries. This causes a very tight coupling of the drivers to the database. This tight coupling is particularly problematic when a driver is not ready to ship at the same time as the database itself. For example, a first version of a database (DB.1) may support a data type that is called ServerA_Float_V1. If the corresponding first version driver (d.1) ships at the same time as DB.1, then d.1 will likely be able to provide metadata that describes the ServerA_Float_V1 data type. Later, a second version of the database (DB.2) may support a new data type that is called ServerA_Float_V2. If the corresponding second version driver (d.2) is not ready to ship at the same time as DB.2, then the driver will have no way to provide metadata about the ServerA_Float_V2 data type until d.2 is ready to ship.

Another disadvantage of conventional database systems is that they are limited with respect to the flexibility of database schema information. Specifically, conventional databases define a pre-determined list of collections through which database schema information may be exposed. Additionally, an exact pre-determined format is also required for each of the pre-determined collections. These pre-determined collections and formats are problematic because the structure and content of conventional databases is highly variable and greatly dependent on the particular applications for which the data is used. Furthermore, conventional databases require both content and structure to be described in a single collection. This combination of content and structure forces collections to be unduly large and complex, thereby increasing the time required to read and search the collections to generate results. Accordingly, there is a need to improve upon the conventional systems and methods for the exposure of database schema information.

SUMMARY OF THE INVENTION

The present invention is directed to systems and methods for improved exposure of database schema information. Generally, a database driver may retrieve and provide database schema information according to one of two default methods or, also, a third override method. The first default method is to execute a query on the database. The second default method is to retrieve information from a hard-coded collection stored locally at the driver. The third override method is to retrieve information from a designated file that may be updated at any time without having to update the database and/or driver binaries.

According to an aspect of the invention, a configuration file comprises default instructions for retrieving the database schema information according to one of the two default methods. The configuration file may comprise a population mechanism node which indicates which of the two default methods are to be employed. Additionally, the configuration file may also comprise a collection name node that identifies a data collection from which to retrieve the database schema information. The configuration file may also comprise a population string node that specifies a string with which to retrieve the database schema information.

According to another aspect of the invention, the configuration file may also include a command to override the default instructions. In this circumstance, the configuration file may comprise an override node which indicates that the default instructions are to be overridden and identifies the designated file from which to retrieve the database schema information. The designated file may include, for example, database schema information that describes features which are unique to a newly released version of the database, thereby enabling such information to be exposed even if a corresponding driver for the newly released version is not yet available. The designated file may also, for example, enable a developer or others to provide their own schema information that the database may or may not provide. This additional schema information may be provided in the same format or in an entirely different format than the schema information provided by the database.

According to another aspect of the invention, the hard-coded data collections need not conform to a pre-determined list of collections with pre-determined formats. Rather, the hard-coded collections may be both defined and formatted by writers of the driver or possibly other individuals or entities, thereby enabling such collections to accurately and efficiently describe the structure and/or content of the database. For example, to decrease the length and complexity of the collections, separate collections may be employed to describe database structure and database content.

Additional features and advantages of the invention will be made apparent from the following detailed description of illustrative embodiments that proceeds with reference to the accompanying drawings.

BRIEF DESCRIPTION OF THE DRAWINGS

The illustrative embodiments will be better understood after reading the following detailed description with reference to the appended drawings, in which:

FIG. 2 depicts an exemplary query configuration file in accordance with the present invention;

FIG. 3 depicts an exemplary hard-coded configuration file in accordance with the present invention;

DETAILED DESCRIPTION OF ILLUSTRATIVE EMBODIMENTS

The subject matter of the present invention is described with specificity to meet statutory requirements. However, the description itself is not intended to limit the scope of this patent. Rather, the inventors have contemplated that the claimed subject matter might also be embodied in other ways, to include different acts or elements similar to the ones described in this document, in conjunction with other present or future technologies.

Figure 1:
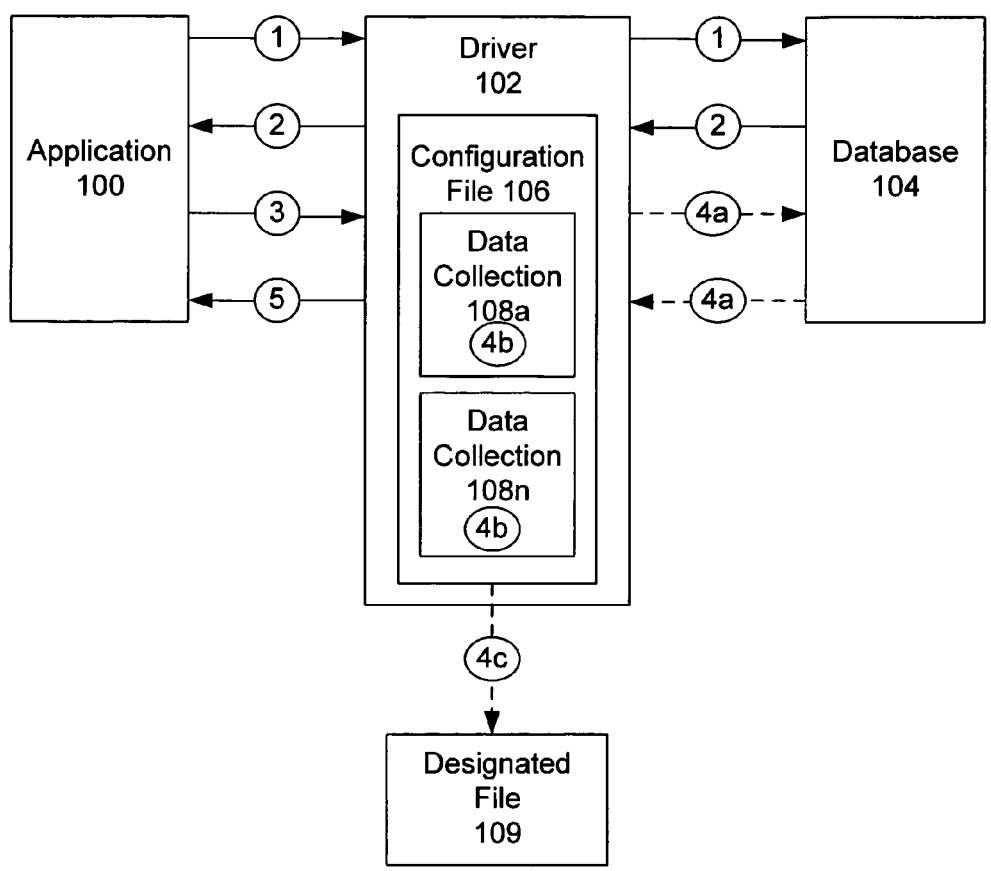
FIG. 1 depicts an exemplary database system in accordance with the present invention.

As set forth above, the present invention is directed to systems and methods for improved exposure of database schema information. An exemplary database system in accordance with the present invention is shown in FIG. 1. Generally, driver 102 is a middle layer that provides application 100 with access to database 104. Driver 102 may perform tasks such as, for example, translating data queries from application 102 into commands that are executable at database 104. To enable database 104 to be accessed in an efficient manner, driver 102 exposes database schema information to application 100. Such database schema information is metadata that describes the structure and/or content of database 104.

According to an embodiment of the invention, database schema information may be exposed in accordance with acts 1-5 of FIG. 1. At act 1, application 100 submits an open request to driver 102, which is passed through to database 104. At act 2, an open connection is returned by database 104 to driver 102 and passed through to application 100. At act 3, application 100 uses the open connection to request the database schema information. The database schema information may be requested, for example, by submitting a "get schema" call to driver 102. At act 4, driver 102 retrieves the database schema information, and, at act 5, returns the retrieved database schema information to application 100. The retrieval of database schema information at act 4 may be performed by driver 102 according to one of three methods, depicted by the dashed lines of steps 4a-4c.

Generally, act 4a depicts a query method in which driver 102 submits a query to database 104 to retrieve the database schema information. Act 4b depicts a hard-coded method in which driver 102 retrieves the database schema information from one of the hard-coded data collections 108a-n within configuration file 106. The query method depicted by act 4a and the hard-coded method depicted by act 4b are default information retrieval methods, meaning that configuration file 106 will include default instructions that command driver 102 to employ one of these two methods. Act 4c, on the other hand, depicts an override method which is only triggered by overriding the default instructions. Specifically, if the default instructions are overridden, then configuration file 106 will include instructions to retrieve the database schema information from a separate designated file 109 as depicted by act 4c.

Configuration file 106 may be written in extensible markup language (XML) and may include a number of nodes that specify the default instructions. For example, configuration file 106 may include a population mechanism node that indicates which of the two default methods 4a or 4b are to be employed. Additionally, the configuration file 106 may include a collection name node that identifies a data collection from which to retrieve the database schema information. Such a data collection may be one of hard-coded data collections 108a-n or a data collection stored at database 104. The configuration file may also include a population string node that specifies a string with which to retrieve the database schema information from the data collection.

Referring now to FIG. 2, exemplary configuration file 106a includes instructions for retrieving database schema information by querying database 104. Configuration file 106a specifies that the population mechanism is a "SQLCommand," which indicates that a query will be executed on database 104. The collection name node of configuration file 106a indicates that the query will be executed on a table called "Tables," which is stored at database 104. As should be appreciated, in addition to individual tables, a query may be executed on one or more rows or columns, or groups of tables. The population string node specifies a string with which to query "Tables."

Referring now to FIG. 3, exemplary configuration file 106b includes instructions for retrieving database schema information from a hard-coded data collection 108a-n within configuration file 106. Configuration file 106b specifies that the population mechanism is a "DataTable," which indicates that a hard-coded data collection 108a-n will be examined. The collection name node of configuration file 106b indicates that the query will be executed on a data collection called "DataTypes," which is depicted below the "MetaDataCollections" node in FIG. 4. The "DataTypes" collection is also referenced in the population string node.

Hard coded data collections 108a-n provide improved flexibility because they need not conform to a pre-determined list of collections with pre-determined formats. Rather, hard-coded collections 108a-n may be both defined and formatted by writers of driver 102 or possibly other individuals or entities. This enables hard-coded collections 108a-n to accurately and efficiently describe the structure and/or content of database 104. For example, to decrease the length and complexity of collections 108a-n, the content and structure of database 102 may be described using separate collections.

While FIGS. 2 and 3 depict default instructions for retrieving database schema information, these default instructions may be overridden by a database developer or any other user. Override method 4c of FIG. 1 provides improved extensibility by employing a separate designated file 109, which may be updated at any time without having to update the database and/or driver binaries. Thus, override method 4c may, for example, enable the retrieval of metadata that describes features unique to a newly released version of database 104, even when a corresponding version of driver 102 is not yet available to the public. For example, a newly released second version of database 104 (DB.2) may be updated to support a new data type, ServerA_Float_V2, which was not supported by the first version. However, a corresponding second version driver 102 (d.2) may not yet be ready to ship. In this scenario, even though d.2 is not yet available, the database schema information that describes ServerA_Float_V2 may be provided at any time by simply providing it within designated file 109.

In addition to information about new database versions, the override feature may also, for example, enable a developer or others to provide their own schema information that the database may or may not provide. This additional schema information may be provided in the same format or in an entirely different format than the schema information provided by the database. Thus, in addition to providing temporal extensibility through new version updates, the override feature also provides personal extensibility by enabling developers or any other individual, group, or entity to submit their own schema information in a format that is best suited for their particular needs and capabilities.

Figure 4:
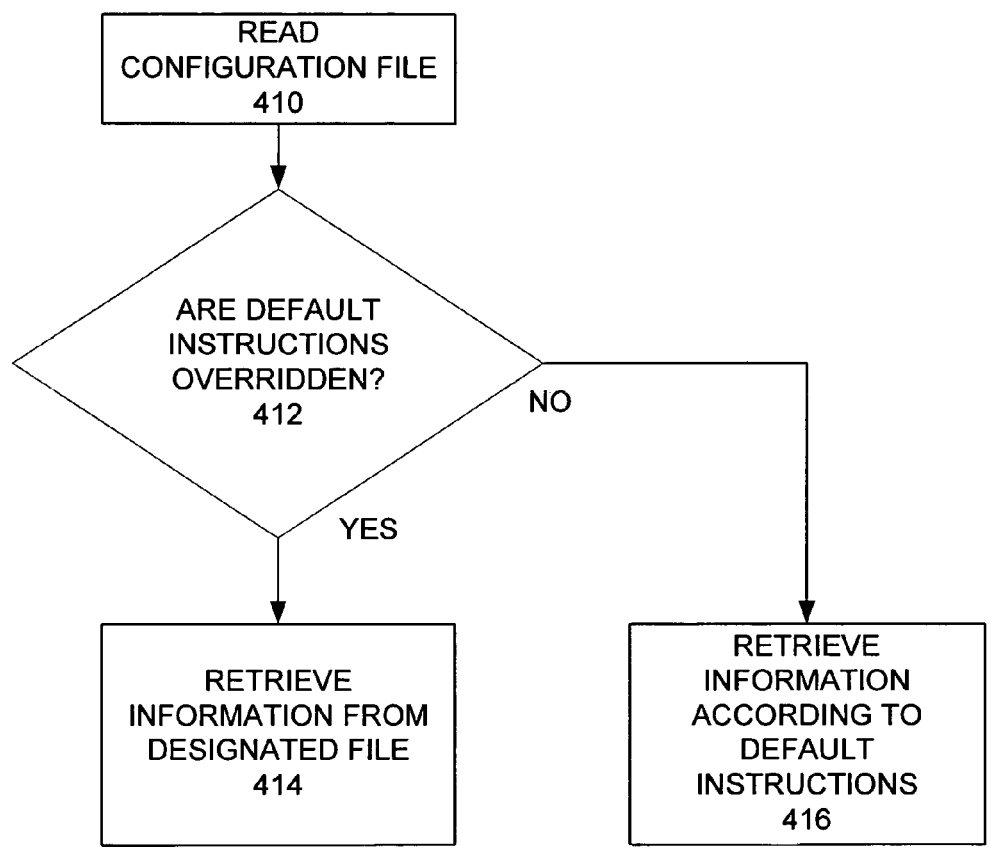
FIG. 4 depicts an exemplary method for retrieving database schema information in accordance with the present invention.

An exemplary method for retrieving database schema information in accordance with the present invention is shown in FIG. 4. The flowchart of FIG. 4 corresponds to acts 4a-4c of FIG. 1. At act 410, driver 102 reads configuration file 106, which includes the default instructions for retrieving the database schema information. As set forth above, the default instructions include a command to retrieve the database schema information according to either query method 4a or hard-coded method 4b. At act 412, driver 102 determines whether the default instructions in configuration file 106 are overridden. The default instructions may be overridden by, for example, the addition of an XML override node to configuration file 106 that identifies the designated file 109. If the default instructions are overridden, then, at act 414, driver 102 retrieves the database schema information from designated file 109, as depicted by act 4c of FIG. 1. If, on the other hand, the default instructions are not overridden, then, at act 416, driver 102 retrieves the database schema information according to the default instructions. If the default instructions are to employ query method 4a of FIG. 1, then driver 102 submits a query to database 104 and returns the results of the query to application 100. If the default instructions are instead to employ hard-coded method 4b of FIG. 1, then driver 102 locates the specified hard coded collection 108a-n within configuration file 106 to provide the database schema information.

As is apparent from the above, all or portions of the various systems, methods, and aspects of the present invention may be embodied in hardware, software, or a combination of both. When embodied in software, the methods and apparatus of the present invention, or certain aspects or portions thereof, may be embodied in the form of program code (i.e., instructions). This program code may be stored on a computer-readable medium, such as a magnetic, electrical, or optical storage medium, including without limitation a floppy diskette, CD-ROM, CD-RW, DVD-ROM, DVD-RAM, magnetic tape, flash memory, hard disk drive, or any other machine-readable storage medium, wherein, when the program code is loaded into and executed by a machine, such as a computer or server, the machine becomes an apparatus for practicing the invention. A computer on which the program code executes will generally include a processor, a storage medium readable by the processor (including volatile and non-volatile memory and/or storage elements), at least one input device, and at least one output device. The program code may be implemented in a high level procedural or object oriented programming language. Alternatively, the program code can be implemented in an assembly or machine language. In any case, the language may be a compiled or interpreted language.

The present invention may also be embodied in the form of program code that is transmitted over some transmission medium, such as over electrical wiring or cabling, through fiber optics, over a network, including a local area network, a wide area network, the Internet or an intranet, or via any other form of transmission, wherein, when the program code is received and loaded into and executed by a machine, such as a computer, the machine becomes an apparatus for practicing the invention.

When implemented on a general-purpose processor, the program code may combine with the processor to provide a unique apparatus that operates analogously to specific logic circuits.

Moreover, the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services.

Distributed computing facilitates sharing of computer resources and services by exchange between computing devices and systems. These resources and services include, but are not limited to, the exchange of information, cache storage, and disk storage for files. Distributed computing takes advantage of network connectivity, allowing clients to leverage their collective power to benefit the entire enterprise. In this regard, a variety of devices may have applications, objects or resources that may implicate processing performed in connection with the present invention.

Figure 5:
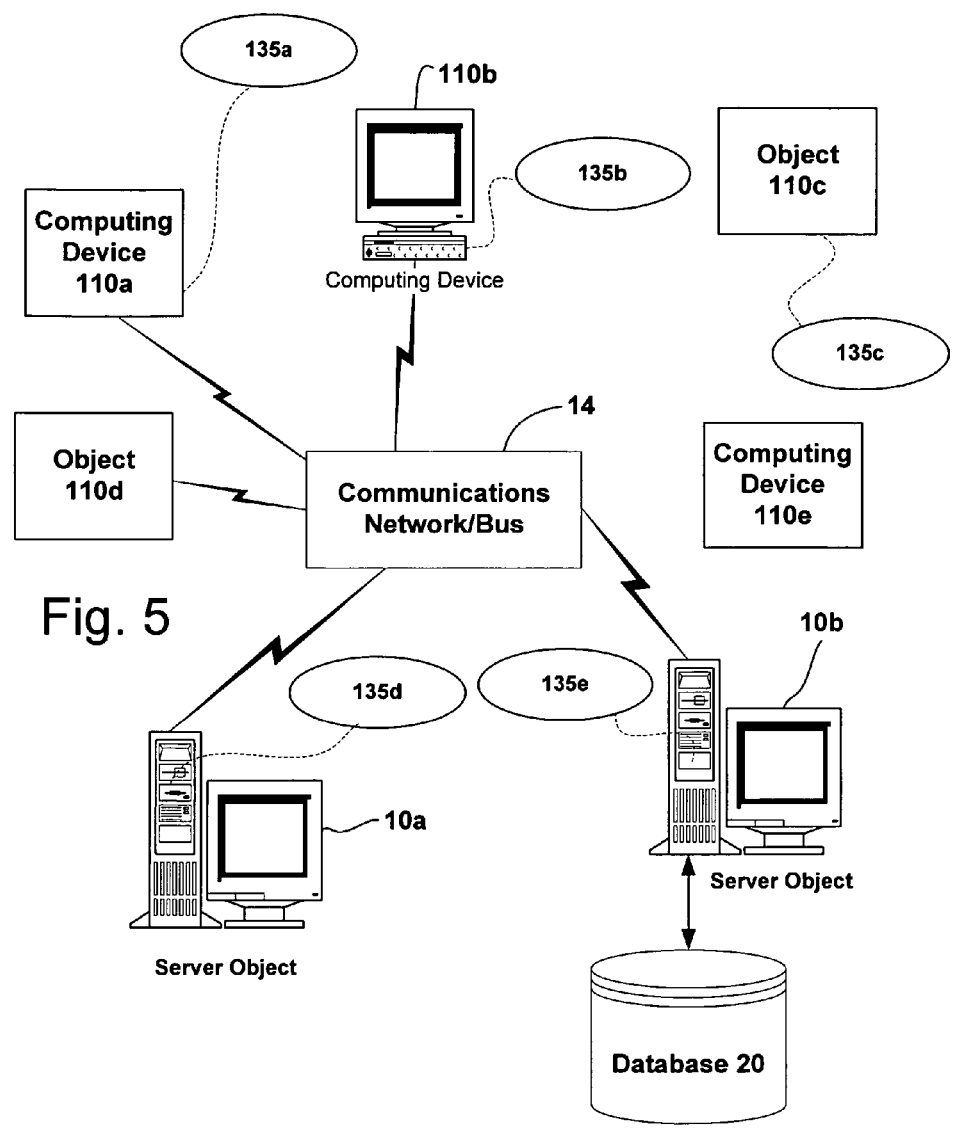
FIG. 5 is a block diagram representing an exemplary network environment having a variety of computing devices in which the present invention may be implemented.

FIG. 5 provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, televisions, MP3 players, personal computers, etc. Each object can communicate with another object by way of the communications network 14. This network may itself comprise other computing objects and computing devices, and may itself represent multiple interconnected networks. In accordance with an aspect of the invention, each object 10a, 10b, etc. or 110a, 110b, 110c, etc. may contain an application that might make use of an API, or other object, software, firmware and/or hardware, to request use of the processes used to implement the present invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many of the networks are coupled to the Internet, which provides the infrastructure for widely distributed computing and encompasses many different networks. Any of the infrastructures may be used for exemplary communications made incident to the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network (s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 5, computers 110a, 110b, etc. can be thought of as clients and computer 10a, 10b, etc. can be thought of as servers, although any computer could be considered a client, a server, or both, depending on the circumstances. Any of these computing devices may be processing data in a manner that implicates the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the invention may be distributed across multiple computing devices.

Client(s) and server(s) may communicate with one another utilizing the functionality provided by a protocol layer. For example, Hypertext Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over any available communications medium.

Thus, FIG. 5 illustrates an exemplary networked or distributed environment, with a server in communication with client computers via a network/bus, in which the present invention may be employed. The network/bus 14 may be a LAN, WAN, intranet, the Internet, or some other network medium, with a number of client or remote computing devices 110a, 110b, 1109c, 110d, 110e, etc., such as a portable computer, handheld computer, thin client, networked appliance, or other device, such as a VCR, TV, oven, light, heater and the like in accordance with the present invention.

In a network environment in which the communications network/bus 14 is the Internet, for example, the servers 10a, 10b, etc. can be servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any computer 10a, 10b, 110a, 110b, etc. may be responsible for the maintenance and updating of a database, memory, or other storage element 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Figure 6:
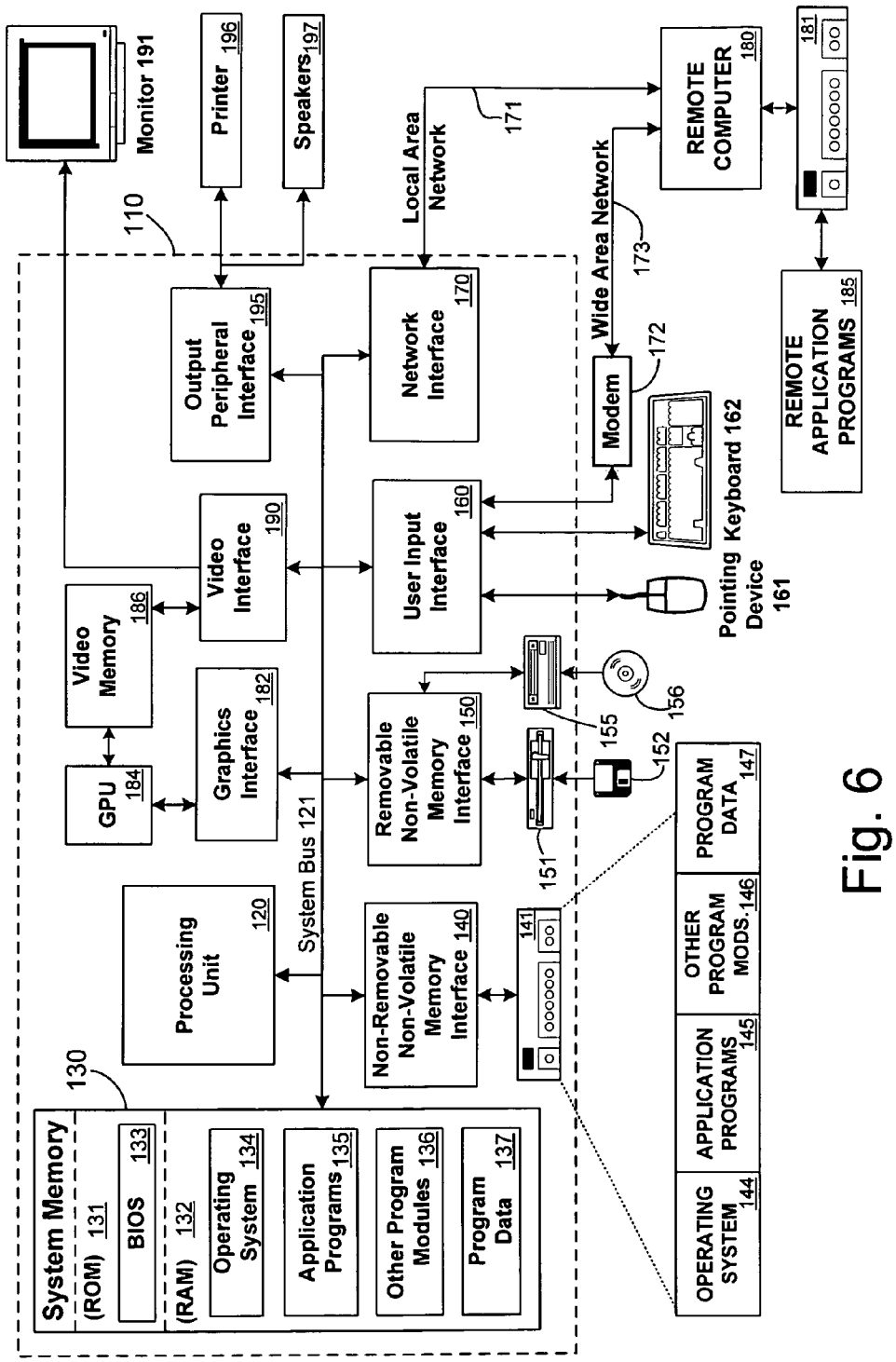
FIG. 6 is a block diagram of an exemplary representing an exemplary computing device in which the present invention may be implemented.

FIG. 6 and the following discussion are intended to provide a brief general description of a suitable computing device in connection with which the invention may be implemented. For example, any of the client and server computers or devices illustrated in FIG. 5 may take this form. It should be understood, however, that handheld, portable and other computing devices and computing objects of all kinds are contemplated for use in connection with the present invention, i.e., anywhere from which data may be generated, processed, received and/or transmitted in a computing environment. While a general purpose computer is described below, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data may be stored or from which data may be retrieved or transmitted to another computer is a desirable, or suitable, environment for operation of the object persistence methods of the invention.

Although not required, the invention can be implemented via an operating system, for use by a developer of services for a device or object, and/or included within application or server software that operates in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like.

FIG. 6 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 6, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include both volatile and nonvolatile, removable and non-removable media implemented in any method or technology for storage of information such as computer readable instructions, data structures, program modules or other data. Computer storage media include, but are not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embody computer readable instructions, data structures, program modules or other data in a modulated data signal such as a carrier wave or other transport mechanism and include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable, volatile/nonvolatile computer storage media. By way of example only, FIG. 6 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-RW, DVD-RW or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6 provide storage of computer readable instructions, data structures, program modules and other data for the computer 110. In FIG. 6, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, such as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182 may also be connected to the system bus 121. One or more graphics processing units (GPUs) 184 may communicate with graphics interface 182. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

CONCLUSION

Thus, systems and methods for exposing database schema information have been disclosed. While the present invention has been described in connection with the preferred embodiments of the various figures, it is to be understood that other similar embodiments may be used or modifications and additions may be made to the described embodiment for performing the same function of the present invention without deviating therefrom. Therefore, the present invention should not be limited to any single embodiment, but rather should be construed in breadth and scope in accordance with the appended claims.

What is claimed:

1. A method for providing database schema information comprising:
    reading, by a database driver, a configuration file having default instructions for retrieving the database schema information, the default instructions being one of instructions to execute a query on a database and instructions to retrieve hard-coded information from within the configuration file;
    if the default instructions are overridden, then retrieving, by the database driver, the database schema information from a designated file that is external to the database driver and to the database, whereby the designated file is generated and is updatable without altering the database driver, and whereby the designated file is accessible without accessing the database; and
    if the default instructions are not overridden, then retrieving, by the database driver, the database schema information according to the default instructions
    wherein retrieving the database schema information according to the default instructions comprises retrieving the database schema information according to a population mechanism node in the configuration file, the population mechanism node having one of a command to execute the query on the database and a command to retrieve the hard-coded information, and
    wherein retrieving the database schema information according to the default instructions comprises retrieving the database schema information according to a population string node in the configuration file, the population string node identifying a string with which to retrieve the database schema information.

2. The method of claim 1, further comprising identifying an override node in the configuration file that indicates that the default instructions are overridden and identifies the designated file.

3. The method of claim 1, comprising retrieving the database schema information from the designated file that has information about at least one database feature that is unique to a most recent version of the database.

4. The method of claim 1, wherein retrieving the database schema information according to the default instructions comprises retrieving the database schema information according to a collection name node in the configuration file, the collection name node identifying a data collection from which to retrieve the database schema information.

5. The method of claim 4, comprising retrieving the database schema information according to the collection name node that identifies the data collection that is one of a database content collection and a database structure collection.

6. A system for providing database schema information, comprising:
    a processor;
    a memory;
    a configuration file having default instructions for retrieving the database schema information, the default instructions being one of instructions to execute a query on a database and instructions to retrieve hard-coded information from within the configuration file; and
    a database driver that retrieves the database schema information by:
        if the default instructions are overridden, then retrieving the database schema information from a designated file that is external to the database driver and to the database, whereby the designated file is generated and is updatable without altering the database driver, and whereby the designated file is accessible without accessing the database, and
        if the default instructions are not overridden, then retrieving the database schema information according to the default instructions
    wherein the configuration file comprises a population mechanism node that has one of a command to execute the query on the database and a command to retrieve the hard-coded information, and
    wherein the configuration file further comprises a population string node that identifies a string with which to retrieve the database schema information.

7. The system of claim 6, wherein the configuration file comprises an override node that indicates that the default instructions are overridden and identifies the designated file.

8. The system of claim 6, wherein the designated file has information about at least one database feature that is unique to a most recent version of the database.

9. The system of claim 6, wherein the configuration file comprises:
    a collection name node that identifies a data collection from which to retrieve the database schema information.

10. The system of claim 9, wherein the data collection is one of a database content collection and a database structure collection.

11. A computer readable storage medium having stored thereon computer executable instructions for performing the following steps:
    reading, by a database driver, a configuration file having default instructions for retrieving database schema information, the default instructions being one of instructions to execute a query on a database and instructions to retrieve hard-coded information from within the configuration file;

if the default instructions are overridden, then retrieving, by the database driver, the database schema information from a designated file that is external to the database driver and to the database, whereby the designated file is generated and is updatable without altering the database driver, and whereby the designated file is accessible without accessing the database; and if the default instructions are not overridden, then retrieving, by the database driver, the database schema information according to the default instructions wherein retrieving the database schema information according to the default instructions comprises retrieving the database schema information according to a population mechanism node in the configuration file, the population mechanism node having one of a command to execute the query on the database and a command to retrieve the hard-coded information, and wherein retrieving the database schema information according to the default instructions comprises retrieving the database schema information according to a population string node in the configuration file, the population string node identifying a string with which to retrieve the database schema information.

12. The computer readable storage medium of claim 11, wherein the configuration file comprises an override node that indicates that the default instructions are overridden and identifies the designated file.

13. The computer readable storage medium of claim 11, wherein the designated file has information about at least one database feature that is unique to a most recent version of the database.

14. The computer readable storage medium of claim 11, wherein the configuration file comprises a collection name node that identifies a data collection from which to retrieve the database schema information.

15. The computer readable storage medium of claim 14, wherein the data collection is one of a database content collection and a database structure collection.

* * * * *

UNITED STATES PATENT AND TRADEMARK OFFICE
CERTIFICATE OF CORRECTION

| | | |
|---|---|---|
| PATENT NO. | : 7,412,456 B2 | Page 1 of 1 |
| APPLICATION NO. | : 11/063421 | |
| DATED | : August 12, 2008 | |
| INVENTOR(S) | : Carl Yates Perry et al. | |

It is certified that error appears in the above-identified patent and that said Letters Patent is hereby corrected as shown below:

In column 6, line 39, delete "1Oa," and insert -- 10a, --, therefor.

In column 7, line 62, delete "1109c," and insert -- 110c, --, therefor.

Signed and Sealed this

Third Day of May, 2011

David J. Kappos
*Director of the United States Patent and Trademark Office*